United States Patent
Okamura et al.

[11] Patent Number: 5,988,713
[45] Date of Patent: Nov. 23, 1999

[54] BUMPER REINFORCEMENT

[75] Inventors: Masaharu Okamura, Hiroshima; Toshifumi Sakai, Higashihiroshima, both of Japan

[73] Assignee: Daikyo Co., Ltd., Higashihiroshima, Japan

[21] Appl. No.: 08/928,438

[22] Filed: Sep. 12, 1997

[30] Foreign Application Priority Data

Sep. 13, 1996 [JP] Japan .................................. 8-242943

[51] Int. Cl.$^6$ .................................................. B60R 19/03
[52] U.S. Cl. ............................................................ 293/120
[58] Field of Search .............................................. 293/120

[56] References Cited

U.S. PATENT DOCUMENTS 5,141,273  8/1992  Freeman ........................... 293/120 X

FOREIGN PATENT DOCUMENTS 0102746  8/1980  Japan ..................................... 293/120

Primary Examiner—Dennis H. Pedder
Attorney, Agent, or Firm—Foley & Lardner

[57] ABSTRACT

A bumper reinforcement has a generally reversely positioned U-shaped cross section, which is adapted to be combined with a bumper face having a generally U-shaped cross section to constitute a bumper. The bumper reinforcement is removably assembled to within an opening of the bumper face with an opening side of the bumper reinforcement directed toward the bumper face. Also, the bumper reinforcement has a plurality of vertical reinforcing ribs that extend vertically to link upper face portion and lower face portion of the bumper reinforcement with each other, and for segments partitioned by the vertical reinforcing ribs, diagonal reinforcing ribs extend diagonally in the segments and stretched diagonally across vertical reinforcing ribs on both sides of each segment, linking them with each other. The vertical reinforcing ribs and the diagonal reinforcing ribs are integrally molded in the bumper reinforcement.

4 Claims, 3 Drawing Sheets

BUMPER REINFORCEMENT

BACKGROUND OF THE INVENTION

The present invention relates to a bumper reinforcement to be placed within a bumper face in bumpers of vehicles, such as automobiles.

As the bumper structure for vehicles such as automobiles, there has conventionally been widely well known a bumper structure in which a bumper reinforcement as a reinforcing member is placed inside the bumper face and between them is disposed an impact energy absorber made of, for example, urethane resin foaming material or the like.

In recent years, with a view to reducing the parts count and thereby realizing the simplification of the structure, as well as reducing manufacturing cost, it has also been under consideration to impart impact energy absorbency to a bumper reinforcement and make up a bumper from this reinforcement and the bumper face. In this case, generally, the bumper reinforcement is formed from synthetic resin.

As a bumper of this type, for example, Japanese Utility Model Laid-Open Publication SHO 63-166855 has disclosed a bumper in which the bumper reinforcement is formed into a U shape in its cross section and placed on the rear face side of the bumper face with the open end side of the U shape directed forward, where the two members are fixed to each other with adhesive.

However, if the bumper face and the bumper reinforcement are adhesively fixed as in the above conventional case, there would be disadvantages such as needing a time consuming bonding process, which requires drying time of adhesive. Moreover, the whole bumper including the bumper reinforcement, needs to be replaced even when only the bumper face is damaged. Further, because a metallic bracket for use of mounting the bumper reinforcement to vehicle-body side members generally needs to be preliminarily provided inside the bumper reinforcement and this metallic bracket could not be removed even at disposal of the bumper reinforcement, the bumper reinforcement formed from synthetic resin would result in poor recyclability another disadvantage.

As to the bumper performance at a collision of the vehicle, when a collision load is input to the bumper face, the less backward displacement of the bumper reinforcement rear face (in particular, the rear face of central portion in the direction of vehicle width) is preferable in terms of the protection of the vehicle body. For example, in the legal regulations of the United States, so-called pendulum tests are provided in PART 581.

Under the circumstance that the structure for improving such performance has been being discussed in various ways, there is a need for a bumper reinforcement without any complication of the prior art structure and increased manufacturing cost and the like.

SUMMARY OF THE INVENTION

Therefore, the present invention has been developed to provide a bumper reinforcement that can be removably assembled to the bumper face and improved in the bumper performance at a collision of the vehicle with a relatively simple construction.

For this purpose, according to a first aspect of the present invention, there is provided a bumper reinforcement having a generally reversely positioned U-shaped cross section, which is adapted to be combined with a bumper face having a generally U-shaped cross section to constitute a bumper, characterized in that the bumper reinforcement is removably assembled to within an opening of the U-shaped cross section of the bumper face with an opening side of the generally reversely U-shaped cross section of the bumper reinforcement directed toward the bumper face, thereby constituting a bumper assembly.

Also, according to a second aspect of the present invention, there is provided a bumper reinforcement according to the first aspect of the invention, with a plurality of vertical reinforcing ribs that extend vertically so as to link upper face portion and lower face portion of the bumper reinforcement with each other, and diagonal reinforcing ribs disposed inside of at least specified ones of segments partitioned by the vertical reinforcing ribs so as to extend diagonally in the specified segments and stretched diagonally across vertical reinforcing ribs placed on both sides of each of the specified segments, linking them with each other, wherein the vertical reinforcing ribs and the diagonal reinforcing ribs are integrally molded in the bumper reinforcement.

Further, according to a third aspect of the present invention, there is provided a bumper reinforcement according to the second aspect of the invention, wherein for at least specified ones out of the segments partitioned by the vertical reinforcing ribs, the diagonal reinforcing ribs are provided one by one inside each of the specified segments, and molded by using a synthetic resin material having mechanical characteristics of 18500 $kgf/cm^2$ or more bending modulus of elasticity, 400 $kgf/cm^2$ or more bending strength and 80% or more tensile elongation.

The above prescription of mechanical characteristics (bending modulus of elasticity, bending strength and tensile elongation) of the synthetic resin material for molding the bumper reinforcement is due to the fact that their characteristic values, if lower than the above ones, would make it impossible to attain sufficient improvement in the bumper performance at a collision of the vehicle in the case of a bumper reinforcement in which the diagonal reinforcing ribs are provided for at least specified ones out of the segments partitioned by vertical reinforcing ribs so as to be provided one by one inside each of the specified segments.

Furthermore, according to a fourth aspect of the present invention, there is provided a bumper reinforcement according to the second aspect of the invention, wherein for at least specified ones out of the segments partitioned by the vertical reinforcing ribs, two pieces of the diagonal reinforcing ribs crossing each other are provided inside each of the specified segments, and molded by using a synthetic resin material having mechanical characteristics of 18000 $kgf/cm^2$ or more bending modulus of elasticity, 260 $kgf/cm^2$ or more bending strength and 80% or more tensile elongation.

The above prescription of mechanical characteristics (bending modulus of elasticity, bending strength and tensile elongation) of the synthetic resin material for molding the bumper reinforcement is due to the fact that their characteristic values, if lower than the above ones, would make it impossible to attain sufficient improvement in the bumper performance at a collision of the vehicle in the case of a bumper reinforcement in which two diagonal reinforcing ribs crossing each other are provided for at least specified ones out of the segments partitioned by vertical reinforcing ribs so as to be provided inside each of the specified segments.

DETAILED DESCRIPTION OF THE PREFERRED EMBODIMENTS

Hereinbelow, embodiments of the present invention are described with reference to the accompanying drawings. First, a first embodiment is explained.

Figure 1:
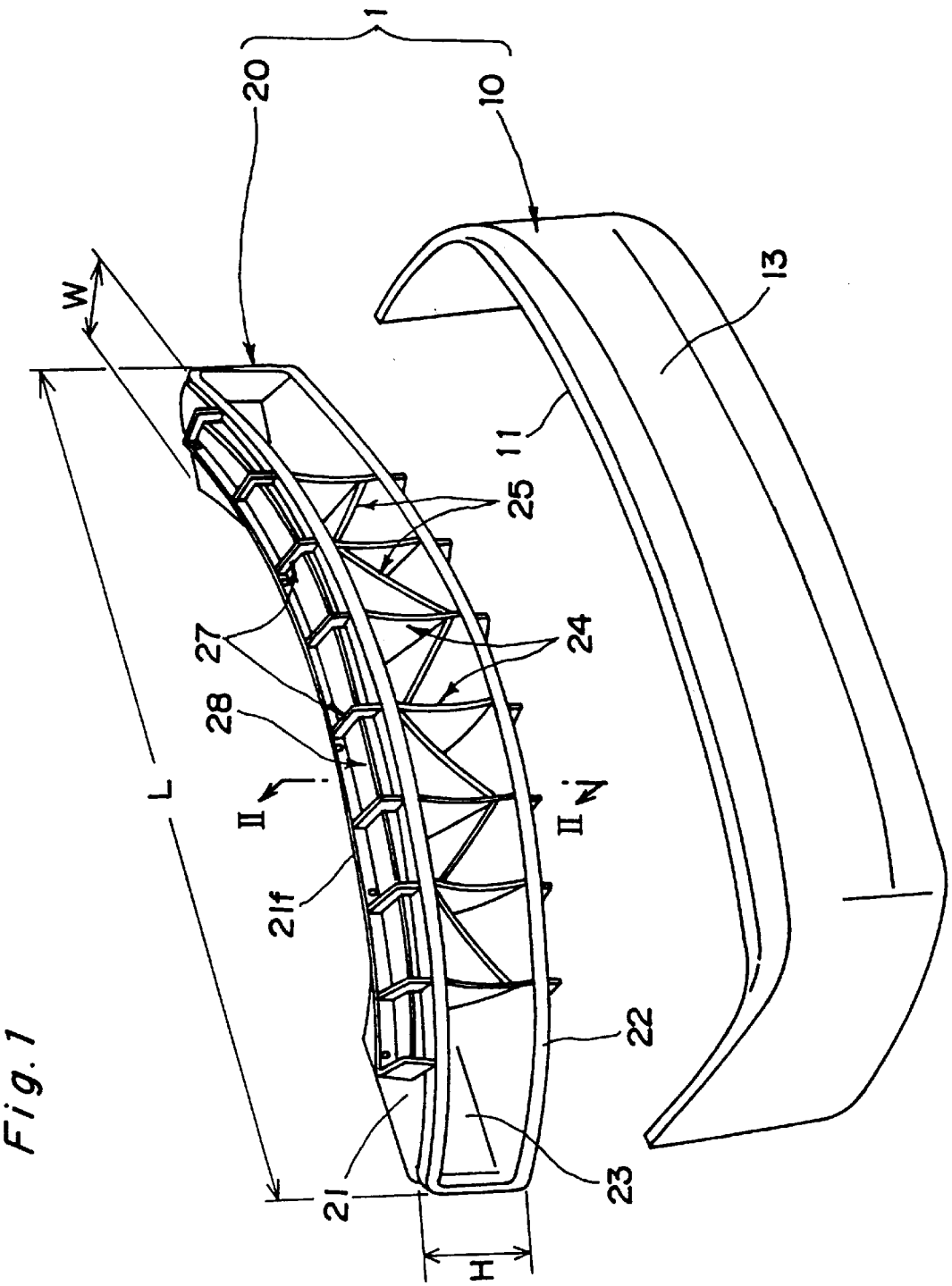
FIG. 1 is an exploded perspective view of a bumper according to a first embodiment of the present invention.

As shown in FIG. 1, a bumper 1 according to the first embodiment of the present invention comprises a bumper face 10 forming the outer skin of the bumper 1, and a bumper reinforcement 20 which, is a reinforcing member of the bumper 1 and absorbs impact energy at a collision of the vehicle.

That is, in the bumper 1 according to this embodiment, without the provision of any impact energy absorber made of, for example, urethane resin foaming material or the like, the bumper reinforcement 20 serves as both a reinforcing member and an impact energy absorber. This is intended for a reduction in the parts count and a simplification of the structure.

Figure 2:
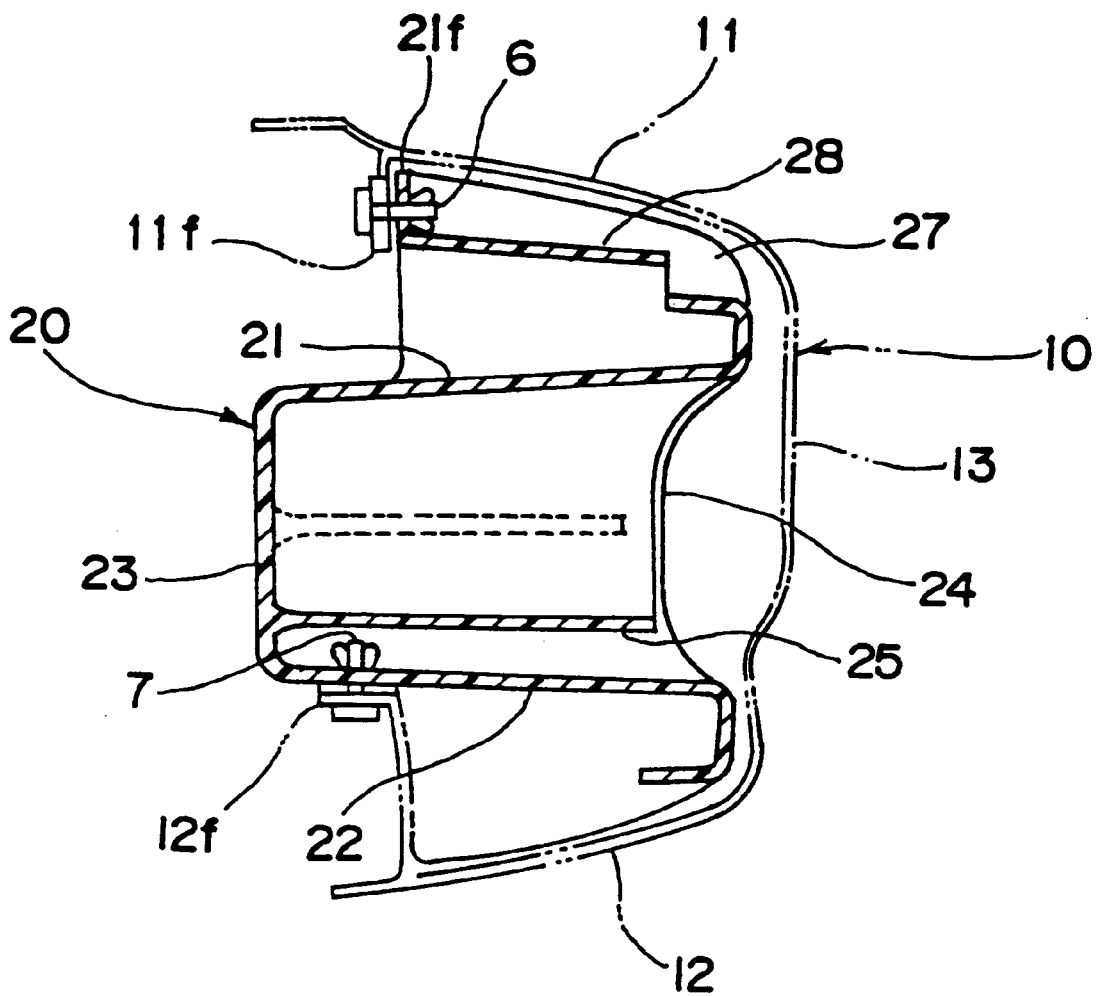
FIG. 2 is an explanatory view in a longitudinal cross section taken along the line II—II of FIG. 1.

As shown in FIG. 2, the bumper face 10 is formed by injection molding with, for example, synthetic resin material so as to be generally U-shaped in cross section by its upper face portion 11, lower face portion 12 and front face portion 13.

The bumper reinforcement 20 is also also formed into a generally U-shaped cross section by its upper face portion 21, lower face portion 22 and rear face portion 23, but reversely positioned with the bumper face 10. The bumper reinforcement 20 is molded by, for example, injection molding process with the use of a specified synthetic resin material as will be detailed later.

This bumper reinforcement 20 is assembled into an opening of the bumper face 10 having the U-shaped cross section while the opening side of the bumper reinforcement having the generally reversely positioned U-shaped cross section is directed toward the bumper face 10. On the upper side of the upper face portion 21 of the bumper reinforcement 20, there are provided a plurality of support ribs 27 for preventing the upper face portion 11 of the bumper face 10 from sagging deformation, and lateral ribs 28 that link one support rib 27 with another to prevent these support ribs 27 from tilting, as it is in a state that the bumper reinforcement 20 has been assembled to the bumper face 10.

Then, an upper flange 21f of the bumper reinforcement 20 and an upper flange 11f of the bumper face 10 are made to face each other, while a lower flange 12f of the bumper face 10 is put into contact with the lower face portion 22 of the bumper reinforcement 20, in which state both 10, 20 are tightened and fixed to each other by screw members 6, 7.

The bumper 1 assembled in this way can be easily disassembled into the bumper face 10 and the bumper reinforcement 20 by unscrewing off the screw members 6, 7. That is, the bumper reinforcement 20 is removably assembled to the bumper face 10, constituting the bumper 1 of assembly type.

In addition, the bumper 1 assembled in the above way is fixed to the vehicle body by abutting the rear face portion 23 of the bumper reinforcement 20 against the vehicle-body side members (not shown) at both end portions in the direction of vehicle width and by tightening and fixing it to the vehicle-body side members with, for example, screw members. In this case, a metallic bracket (not shown) for mounting to the vehicle-body side members is used during the application of the screw members, where this metallic bracket is removably provided to the inside of the bumper reinforcement 20 (inside of the rear face portion 23).

With the bumper 1 built in assembly type as mentioned above, there is no need of the bonding process that requires the troublesome control of time, which would be involved in the conventional case where both 10, 20 are adhesively fixed. Besides, when only the bumper face 10 is damaged, it is sufficient to replace only the face 10 with a new one without replacing the whole bumper 1.

Also, the metallic bracket (not shown) for use of mounting to the vehicle-body side members can also be removably provided to the inside of the bumper reinforcement 20, so that the metallic bracket can be removed at the time of disposal. Thus, even if the bumper reinforcement 20 is made of synthetic resin, metals can be prevented from mixing into the disposal resin material, which contributes to enhancement of the recyclability.

Further, in this embodiment, inside the bumper reinforcement 20 (i.e., within the opening having a generally reversely positioned U-shaped cross section), plate-shaped vertical ribs 24 serving as vertical reinforcing ribs extending vertically as well as plate-shaped diagonal ribs 25 serving as diagonal reinforcing ribs extending diagonally are provided by being integrally molded with the bumper reinforcement 20. The vertical ribs 24 (with plate thickness, e.g., about 3–4 mm) are placed at every specified intervals (e.g., about 100 mm) over a range excluding both end portions of the bumper reinforcement 20 (with plate thickness, e.g., about 3–4 mm) so as to be linked with the upper face portion 21 and the lower face portion 22, preferably as well as the rear face portion 23, of the bumper reinforcement 20. Further, the diagonal ribs 25 are placed at segments partitioned by the vertical ribs 24 so as to be stretched diagonally across the vertical ribs 24 on both sides and to be linked with these two-side vertical ribs 24, preferably as well as the rear face portion 23. It is to be noted that the pattern of diagonal ribs 25 is not limited to the example shown in FIG. 1, and each diagonal rib 25 may be inclined respectively in accordance with any other appropreate pattern.

With the reinforcing ribs 24, 25 provided within the bumper reinforcement 20 as mentioned above, any backward displacement of the rear face of the bumper reinforcement 20 can be suppressed by the vertical ribs 24, while any distortion of the bumper reinforcement 20 can be suppressed and moreover any tilt of the vertical ribs 24 can be prevented by the diagonal ribs 25.

Consequently, the bumper performance at a collision of the vehicle can be improved with a relatively simple construction implemented only by providing the integrally molded reinforcing ribs 24, 25.

More preferably, the longitudinal ribs 24 and the diagonal ribs 25 are formed in such a way that opening-side end portions of the bumper reinforcement 20 are recessed in a generally bow shape. In this case, the bumper 1 can effectively prevent the ribs 24, 25 from cracking and lowering the reinforcement effect, when a collision load has acted on the bumper 1 from the front.

In this embodiment, an evaluation test on mechanical characteristics of synthetic resin materials to be used in the molding of the bumper reinforcement 20 was conducted in order that successful bumper performance at a collision of the vehicle can be obtained in manufacturing the bumper reinforcement 20. Hereinbelow, this evaluation test is explained.

The test was performed on various materials having different characteristic values in items of the bending modulus of elasticity, bending strength and tensile elongation. Bumper reinforcements 20 as shown in FIG. 1 were molded by using these materials, and mechanical characteristic values of the above three items were measured. This test of mechanical characteristic values was performed in compliance with ASTM D790 for bending modulus of elasticity and bending strength, and with ASTM D638 for tensile elongation. Then, the molded bumper reinforcements 20 were subjected to a pendulum test under the condition of, for example, a vehicle weight of 1200 kg, where the bumper reinforcements 20 were judged whether good or not good. Results of the test are shown in Table 1

The approximate principal dimensions of the bumper reinforcements 20 used in this test were as follows:
Length: L=1400 mm
Width: W=130 mm
Height: H=230 mm

TABLE 1

|  | Sample 1 | Sample 2 | Sample 3 | Sample 4 | Sample 5 |
|---|---|---|---|---|---|
| Material resin | PC/PBT | PP | PE | PP + GF | PP |
| Presence or absence of ribs (vertical or diagonal) | Present | Present | Present | Present | Present |
| Bending modulus of elasticity [Kgf/cm$^2$] | 19000 | 32000 | 18000 | 32000 | 20500 |
| Bending strength [Kgf/cm$^2$] | 660 | 450 | 260 | 920 | 340 |
| Tensile elongation [%] | 100 | 90 | 200 | 4 | 70 |
| Evaluation | ○ | ○ | Δ | x | x |

In this test, polycarbonate/polybutylene terephthalate (PC/PBT) resin (Sample 1) and polypropylene (PP) resin (Sample 2) as those which satisfy the conditions of mechanical characteristics of 18500 kgf/cm$^2$ or more bending modulus of elasticity, 400 kgf/cm$^2$ or more bending strength and 80% or more tensile elongation were used for the embodiment of the present invention. As comparative examples, polyethylene (PE) resin (Sample 3), polypropylene (PP) resin (Sample 5) and fiberglass (GF)-added polypropylene (PP) resin (Sample 4) were used.

From the test results of Table 1, it was confirmed that those satisfying the above mechanical characteristics can show successful (○) results in the pendulum test. On the other hand, those not satisfying the mechanical characteristics showed unsatisfactory (Δ) or faulty (x) results in the pendulum test.

As a consequence of the above, in the case where the diagonal ribs 25 are provided one by one within segments partitioned by the vertical ribs 24, successful results can be attained in the pendulum test so that the bumper performance at a collision of the vehicle can be improved, by molding the bumper reinforcement with a synthetic resin material having the above mechanical characteristics (18500 kgf/cm$^2$ or more bending modulus of elasticity, 400 kgf/cm$^2$ or more bending strength and 80% or more tensile elongation).

In the above example, the diagonal ribs 25 have been provided for all the segments partitioned by the vertical ribs over a range excluding both end portions of the bumper reinforcement 20. However, for example, in the case of relatively, low strength characteristic demanded for the bumper reinforcement, it is allowed to provide the diagonal ribs 25 only for one or more specified ones out of the segments partitioned by the longitudinal ribs.

Next, a second embodiment of the present invention is explained. Whereas the first embodiment has been arranged so that a single diagonal ribs 25 is provided within one of the segments partitioned by the vertical ribs 24, 24, this second embodiment has two diagonal ribs crossing each other inside of at least specified ones of the segments.

In the following description, the same components as in the first embodiment are designated by same numerals and their further description is omitted.

Figure 3:
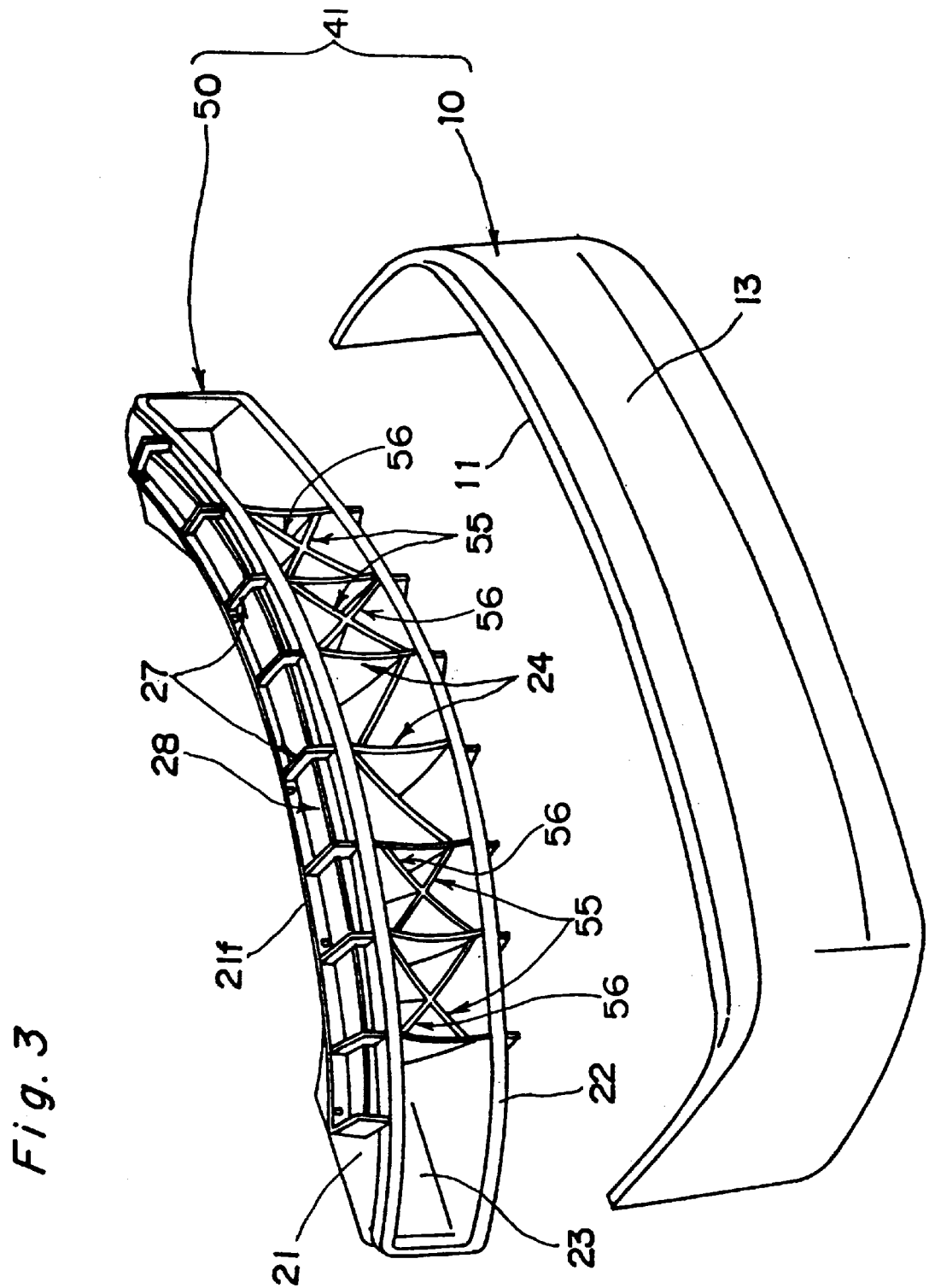
FIG. 3 is an exploded perspective view of a bumper according to a second embodiment of the present invention.

As shown in FIG. 3, in a bumper reinforcement 50 of a bumper 41 according to this embodiment, first diagonal ribs 55 are arranged in the same oblique directions as shown in FIG. 1, as diagonal ribs that are provided within the segments partitioned by the vertical ribs 24, 24 so as to be stretched diagonally across the vertical ribs 24 placed on both sides of each segment and to be linked with these two longitudinal ribs 24, preferably as well as with the rear face portion 23. Besides, second diagonal ribs 56 that cross the first diagonal ribs 55 are disposed in the segments except central two out of the segments partitioned by the longitudinal ribs over a range excluding both end portions of the bumper reinforcement 50. That is, two diagonal ribs 55, 56 crossing each other are provided at each of these segments.

As shown above, the second diagonal ribs 56 are provided in addition to the first diagonal ribs 55 so as to cross them, by which the bumper reinforcement 50 is reinforced more effectively than in the first embodiment.

It is a matter of course that the second diagonal ribs 56 may be provided for all the segments partitioned by the longitudinal ribs. Also, more preferably, the first and second diagonal ribs 55, 56 as well as the vertical ribs 24 are formed in such a way that opening-side end portions of the bumper reinforcement 50 are recessed in a generally bow shape, as in the first embodiment, in which case the bumper 41 can be effectively prevent from cracking the ribs 24, 55, 56 and lower the reinforcing effect, when a collision load has acted on the bumper 41 from the front.

Bumper reinforcements 50 having the above rib structure was molded by using the same resin materials as used in the evaluation test (pendulum test) in the first embodiment. Then, the prepared samples (Samples 6–10) were subjected to the pendulum test under the same conditions as in the first embodiment, where the bumper reinforcements 50 were judged whether good or not. The approximate principal dimensions of the bumper reinforcements were the same as those of the first embodiment. Results of the test are shown in Table 2.

TABLE 2

|  | Sample 6 | Sample 7 | Sample 8 | Sample 9 | Sample 10 |
|---|---|---|---|---|---|
| Material resin | PC/PBT | PP | PE | PP + GF | PP |
| Presence or absence of ribs (vertical or diagonal) | Present | Present | Present | Present | Present |
| Bending modulus of elasticity [Kgf/cm$^2$] | 19000 | 32000 | 18000 | 32000 | 20500 |
| Bending strength [Kgf/cm$^2$] | 660 | 450 | 260 | 920 | 340 |
| Tensile elongation [%] | 100 | 90 | 200 | 4 | 70 |
| Evaluation | ○ | ○ | ○ | x | x |

From the test results of Table 2, those (Sample 6 and Sample 7) using the same materials as in Sample 1 and Sample 2 that had shown successful (○) results in the pendulum test of the first embodiment also showed successful results in this test, and those (Sample 9 and Sample 10) using the same materials as in Sample 4 and Sample 5 that had shown faulty (x) results in the pendulum test of the first embodiment still showed faulty (x) results also in this test.

However, Sample 8 molded with the material of polyethylene (PE) resin, which had showed unsatisfactory (Δ) results as the material of Sample 3 in the pendulum test of the first embodiment, has proved to show successful (○) results in the second embodiment.

As a consequence of the above, in the case where the two diagonal ribs 55, 56 crossing each other are provided inside of specified ones out of the segments partitioned by the vertical ribs 24, even higher reinforcing effect can be attained, as compared with the case where the diagonal reinforcing ribs 25 are provided one by one. In this case, even if the bumper reinforcement 50 is molded by using a synthetic resin material having lower mechanical characteristics (18000 kgf/cm$^2$ or more bending modulus of elasticity, 260 kgf/cm$^2$ or more bending strength and 80% or more tensile elongation) than in the first embodiment, successful results can be attained in the pendulum test and the bumper performance at a collision of the vehicle can be improved. Accordingly, it becomes possible to use highly commercially available and relatively low priced polyethylene (PE) resin as the material resin of the bumper reinforcement 50.

It is a matter of course that the present invention is not limited to the above-described embodiments and may subject to a variety of improvements and changes in design without departing the scope of the spirits of the invention.

According to the first aspect of the present invention, since the bumper reinforcement is removably assembled to within an opening of the U-shaped cross section of the bumper face to constitute a bumper of assembly type, there is no need of the bonding process that requires the troublesome control of time, which would be involved in the conventional case where the two members are adhesively fixed. Besides, when only the bumper face is damaged, it is sufficient to replace only the face with a new one without replacing the whole bumper. Also, a metallic bracket for mounting to the vehicle-body side members can also be removably provided to the inside of the bumper reinforcement, so that the metallic bracket can be removed at the time of disposal. Thus, the bumper reinforcement, when made of synthetic resin, can be enhanced in recyclability.

Further, according to the second aspect of the present invention, basically the same effects as in the first aspect can be produced. Still further, since vertical ribs extending vertically and diagonal ribs extending diagonally are provided inside by being integrally molded, any backward displacement of the rear face of the bumper reinforcement can be suppressed by the vertical reinforcing ribs, while any distortion of the bumper reinforcement can be suppressed and moreover any tilt of the vertical reinforcing ribs can be prevented by the diagonal reinforcing ribs.

Consequently, the bumper performance at a collision of the vehicle can be improved with a relatively simple construction implemented only by providing the integrally molded reinforcing ribs.

Furthermore according, to the third aspect of the present invention, basically the same effects as in the second aspect can be produced. In particular, in the case where, for at least specified ones out of the segments partitioned by the vertical reinforcing ribs, the diagonal reinforcing ribs are provided one by one inside each of the specified segments, the bumper performance at a collision of the vehicle can be improved by molding the bumper reinforcement with a synthetic resin material having the mechanical characteristics (18500 kgf/cm$^2$ or more bending modulus of elasticity, 400 kgf/cm$^2$ or more bending strength and 80% or more tensile elongation).

Furthermore, according to the fourth aspect of the present invention, basically the same effects as in the second aspect can be produced. In particular, for at least specified ones out of the segments partitioned by the longitudinal reinforcing ribs, two pieces of the diagonal reinforcing ribs crossing each other are provided inside each of the specified segments. Therefore, even higher reinforcing effect can be attained, as compared with the case where the diagonal reinforcing ribs are provided one by one. In this case also, the bumper performance at a collision of the vehicle can be improved by molding the bumper reinforcement with a synthetic resin material having the mechanical characteristics (18000 kgf/cm$^2$ or more bending modulus of elasticity, 260 kgf/cm$^2$ or more bending strength and 80% or more tensile elongation).

What is claimed is:

1. A bumper reinforcement comprising:
    a reinforcement beam having a generally U-shaped cross section defined by an upper face portion, a lower face portion spaced from the upper face portion, and a rear face portion extending between the upper and lower face portions, and an open side opposite the rear face portion, wherein the reinforcement beam is for removably connecting to a bumper face having a generally U-shaped cross section defined by an upper face portion, a lower face portion, and a front face portion, with the reinforcement beam reversely positioned with the bumper face so that the open side of the reinforcement beam faces the front face portion of the bumper face;
    a plurality of vertical reinforcing ribs extending vertically and connecting the upper face portion and the lower face portion of the reinforcement beam; and
    a plurality of diagonal reinforcing ribs each extending diagonally between an adjacent pair of vertical reinforcing ribs,
    wherein the reinforcement beam, the vertical reinforcing ribs and the diagonal reinforcing ribs are integrally molded from a synthetic resin material having mechanical characteristics of 18500 kgf/cm$^2$ or more bending modulus of elasticity, 400 kgf/cm$^2$ or more bending strength and 80% or more tensile elongation,
    wherein the vertical ribs and the diagonal ribs are recessed inwardly from the open side of the reinforcement beam.

2. A bumper reinforcement according to claim 1, wherein edges of the vertical ribs and the diagonal ribs on the open side of the reinforcement beam are bowed inwardly toward the rear face portion to recess the vertical ribs and the diagonal ribs from the open side of the reinforcement beam.

3. A bumper reinforcement comprising:
    a reinforcement beam having a generally U-shaped cross section defined by an upper face portion, a lower face portion spaced from the upper face portion, and a rear face portion extending between the upper and lower face portions, and an open side opposite the rear face portion, wherein the reinforcement beam is for removably connecting to a bumper face having a generally U-shaped cross section defined by an upper face portion, a lower face portion, and a front face portion, with the reinforcement beam reversely positioned with the bumper face so that the open side of the reinforcement beam faces the front face portion of the bumper face;
    a plurality of vertical reinforcing ribs extending vertically and connecting the upper face portion and the lower face portion of the reinforcement beam; and a plurality of pairs of crossing diagonal reinforcing ribs each pair extending diagonally between an adjacent pair of vertical reinforcing ribs, wherein the reinforcement beam, the vertical reinforcing ribs and the crossing diagonal reinforcing ribs are integrally molded from a synthetic resin material having mechanical characteristics of 18000 kgf/cm$^2$ or more bending modulus of elasticity, 260 kgf/cm$^2$ or more bending strength and 80% or more tensile elongation, wherein the vertical ribs and the crossing diagonal ribs are recessed inwardly from the open side of the reinforcement beam.

4. A bumper reinforcement according to claim 3, wherein edges of the vertical ribs and the crossing diagonal ribs on the open side of the reinforcement beam are bowed inwardly toward the rear face portion to recess the vertical ribs and the crossing diagonal ribs from the open side of the reinforcement beam.

* * * * *